United States Patent
Ho

(10) Patent No.: US 12,326,182 B1
(45) Date of Patent: Jun. 10, 2025

(54) PLANETARY GEAR TYPE THROWING WHEEL DEVICE

(71) Applicant: Fu-Hung Ho, Taichung (TW)

(72) Inventor: Fu-Hung Ho, Taichung (TW)

( * ) Notice: Subject to any disclaimer, the term of this patent is extended or adjusted under 35 U.S.C. 154(b) by 0 days.

(21) Appl. No.: 18/817,362

(22) Filed: Aug. 28, 2024

(51) Int. Cl.
*F16H 33/18* (2006.01)

(52) U.S. Cl.
CPC .................... *F16H 33/185* (2013.01)

(58) Field of Classification Search
CPC ...................................................... F16H 33/185
See application file for complete search history.

(56) References Cited

U.S. PATENT DOCUMENTS

| | | | | |
|---|---|---|---|---|
| 1,461,558 A | * | 7/1923 | Reece | F16H 33/185 475/255 |
| 1,988,405 A | * | 1/1935 | Walton | F16H 61/0293 475/258 |
| 8,556,764 B1 | | 10/2013 | Ho | |

FOREIGN PATENT DOCUMENTS

| | | | |
|---|---|---|---|
| FR | 546220 A | * | 11/1922 |
| FR | 602671 A | * | 3/1926 |
| FR | 1502008 A | * | 11/1967 |
| GB | 329724 A | * | 5/1930 |
| JP | 2016145638 A | * | 8/2016 |

* cited by examiner

*Primary Examiner* — Sherry L Estremsky

(57) ABSTRACT

A planetary gear type throwing wheel device contains: a central shaft rotatably locked on two rotatable discs, and a transmission gear locked on the central shaft. Each rotatable disc includes three supports and three columns rotatably connect with three throwing force gears. The transmission gear drives the three throwing force gears to rotate. Each throwing force gear includes a defining portion, and multiple counterweight elements are disposed on the defining portion. A generator rotation wheel is fixed on a top rotatable disc, an actuation shaft is connected with the central shaft, and the actuation shaft has a driving wheel, such that the driving wheel drives the transmission gear to rotate the three throwing force gears simultaneously so that the six counterweight elements produce a throwing force, and a large torque is generated from the central shaft to rotate the generator rotation wheel.

3 Claims, 6 Drawing Sheets

PLANETARY GEAR TYPE THROWING WHEEL DEVICE

TECHNICAL FIELD

The present invention relates to a planetary gear type throwing wheel device which is applied to produce a large torque and power by using a small power, wherein the three throwing force gears are horizontal to one another so as to rotate stably and smoothly.

BACKGROUND

According to the increasing depletion of petrochemical energy, and the impact of fossil fuels on the environment has become more and more obvious in recent years, thus looking for alternative energy sources (such as wind power, solar energy, ocean energy, hydraulic power, geothermal energy, and biomass energy), and how to effectively utilize them are the most urgent issue at present.

Wind power and hydropower generation can be defined as the use of windmills and waterwheels to convert the kinetic energy of wind and water into rotational motion to drive generators. Even though wind power and hydropower generation are clean and pollution-free energy sources with safety and environmental protection effects, but wind and water power are not inexhaustible natural resources. When there is no wind or water, the generator immediately loses its ability to generate electricity.

To overcome above-mentioned problems, a conventional planetary gear type generating system is disclosed in U.S. Pat. No. 8,556,764 B1 to produce a large torque and to rotate a generator successively by using a small power. However, the throwing wheel device is fixed parallelly at a front end and a rear end, the three throwing force gears are susceptible to the influence of rotational inertia force and gravity, thus resulting in unstable and unsmooth rotation, which not only fails to save power, but also causes a waste of energy.

The present invention has arisen to mitigate and/or obviate the afore-described disadvantages.

SUMMARY

The primary aspect of the present invention is to provide a planetary gear type throwing wheel device which contains a central shaft rotatably locked on centers of two rotatable discs, and a transmission gear locked on the central shaft, wherein each rotatable disc includes three supports isometrically extending outward therefrom, three columns are received in outer ends of the three supports and are configured to rotatably connected with three throwing force gears, and the transmission gear meshes with the three throwing force gears to drive the three throwing force gears to rotate, each throwing force gear includes a defining portion formed on a side of a surface thereof, and multiple counterweight elements are disposed on a top and a bottom of the defining portion, wherein a generator rotation wheel is fixed on a top of a top rotatable disc of the two rotatable discs, an actuation shaft is connected with a bottom of the central shaft, and the actuation shaft has a driving wheel thereon, such that the driving wheel drive the transmission gear to rotate the three throwing force gears simultaneously so that the six counterweight elements produce a throwing force, and a large torque is generated from the central shaft to rotate the generator rotation wheel.

For example, when rotating the power generator in 15 kw, an efficiency of the power generator reaches 90% to produce 13 kw powers. The power generator supplies a small power (such as 1 kw) to the motor, and the other power (i.e. 12 kw) is saved or supplies to other equipment. Due to the three throwing force gears 30 are horizontal to one another, they operate smoothly and stably to save the power consumption.

Preferably, the six counterweight elements are disposed on a top and a bottom of the defining portion.

Preferably, a hollow portion is formed on the other side of the surface of each throwing force gear.

DETAILED DESCRIPTION

Figure 1:
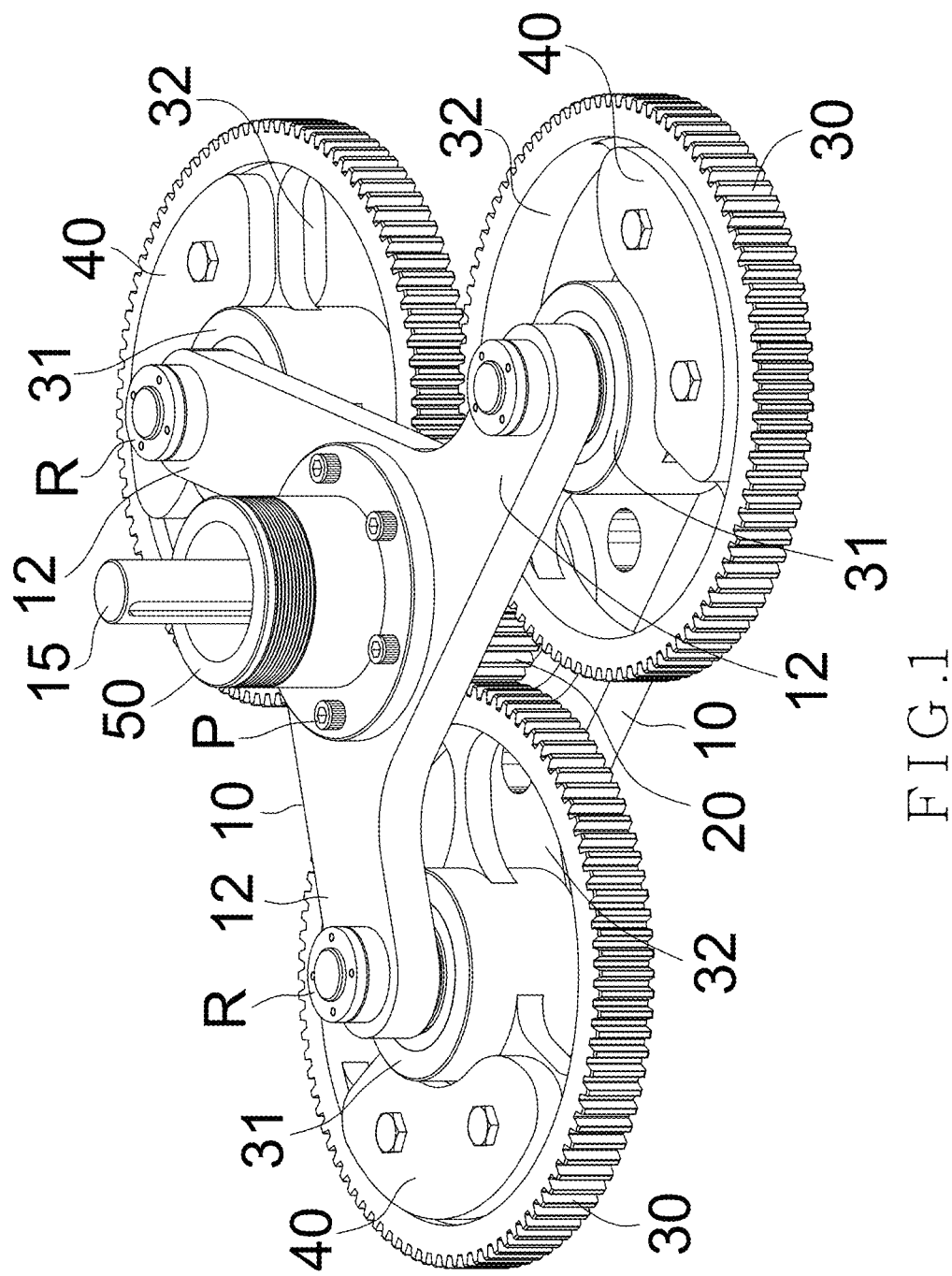
FIG. 1 is a perspective view showing the assembly of a planetary gear type throwing wheel device according to a preferred embodiment of the present invention.
Figure 2:
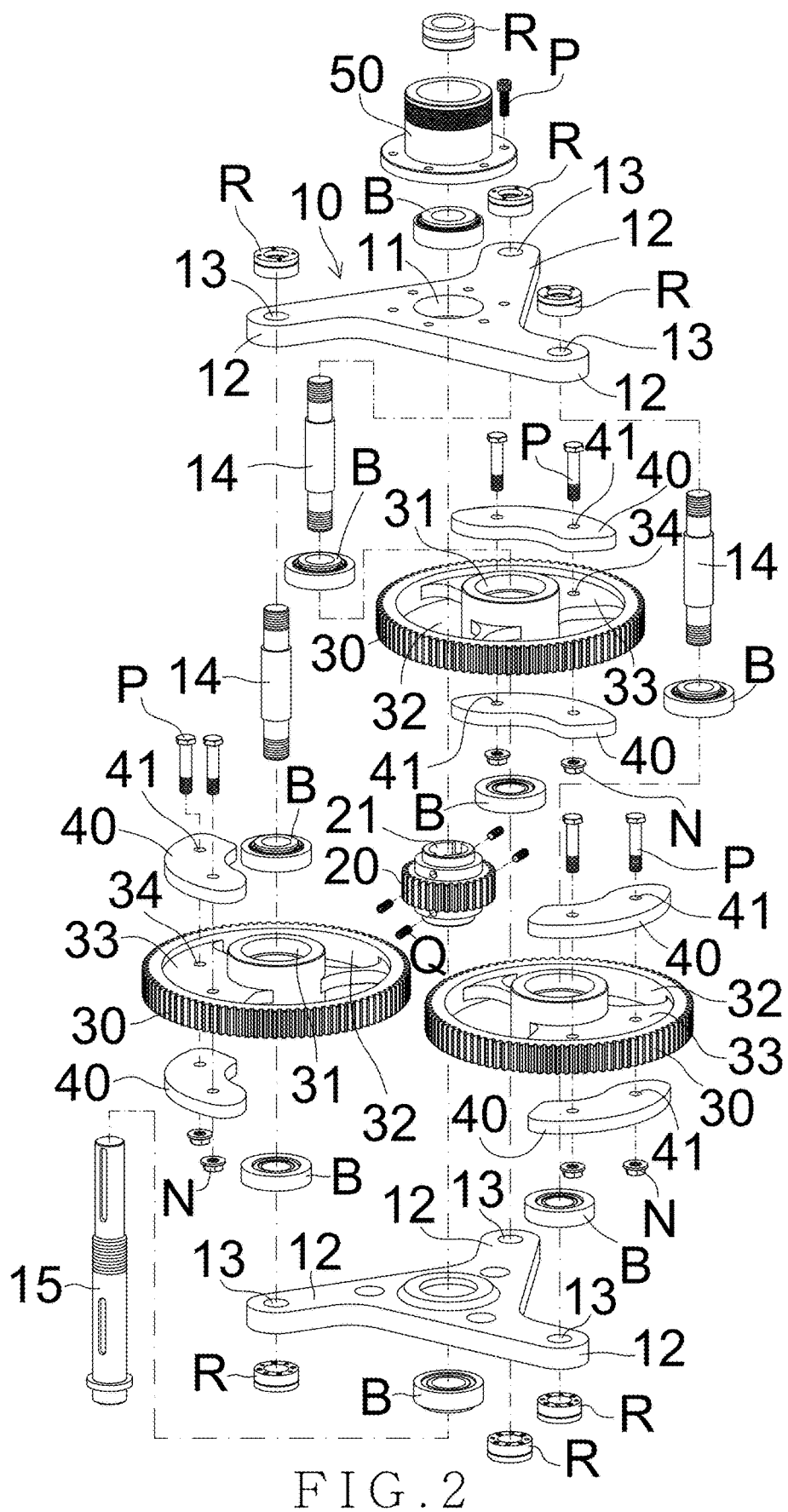
FIG. 2 is a perspective view showing the exploded components of the planetary gear type throwing wheel device according to the preferred embodiment of the present invention.
Figure 3:
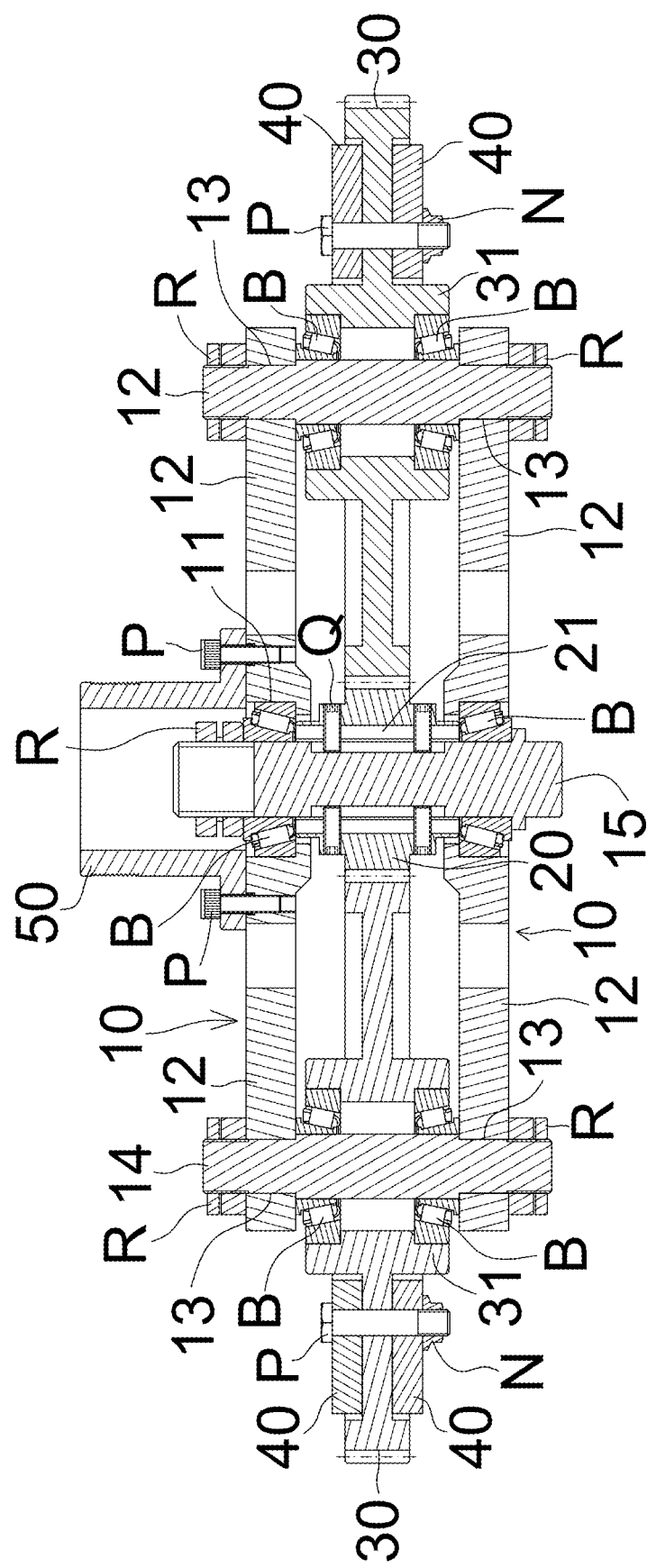
FIG. 3 is a cross sectional view showing the assembly of the planetary gear type throwing wheel device according to the preferred embodiment of the present invention

FIG. 1 is a perspective view showing the assembly of a planetary gear type throwing wheel device according to a preferred embodiment of the present invention. FIG. 2 is a perspective view showing the exploded components of the planetary gear type throwing wheel device according to the preferred embodiment of the present invention. FIG. 3 is a cross sectional view showing the assembly of the planetary gear type throwing wheel device according to the preferred embodiment of the present invention. The planetary gear type throwing wheel device comprises: two rotatable discs 10, a transmission gear 20, three throwing force gears 30, and six counterweight elements 40.

The two rotatable discs 10 are symmetrical, and each rotatable disc 10 includes a fixing orifice 11 defined on a center thereof, three supports 12 isometrically extending outward from the center of each rotatable disc 10, three receiving orifices 13 defined on outer ends of the three supports 12, three columns 14 received in the three receiving orifices 13, wherein a top and a bottom of each column 14 are locked with two locking elements R so that each column 14 is locked in each receiving orifice 13 of each rotatable disc 10, wherein the fixing orifice 11 accommodates a first bearing B to rotatably connected with a central shaft 15, and the central shaft 15 is rotatably locked on the two rotatable discs 10 by using another locking element R, wherein a center of the central shaft 15 is locked with the transmission gear 20 by multiple countersunk screws Q, and each column 14 has a second bearing B configured to rotatably connected with each throwing force gear 30.

The transmission gear 20 includes a coupling orifice 21 defined on a center thereof and configured to accommodate the central shaft 15, wherein the transmission gear 20 meshes with the three throwing force gears 30 to drive the three throwing force gears 30 to rotate simultaneously.

Each throwing force gear 30 includes a connection orifice 31 defined on a center thereof to accommodate a third bearing B, a hollow portion 32 formed on a side of a surface of each throwing force gear 30, a defining portion 33 formed on the other side of the surface of each throwing force gear 30, wherein the six counterweight elements 40 are disposed on a top and a bottom of the defining portion 33.

Each counterweight 40 includes multiple through orifices 41 defined thereon and configured to receive multiple first screws P, and the defining portion 33 has multiple passing orifices 34 defined thereon and configured to receive multiple nuts N, wherein a center of a top rotatable disc 10 is locked with a generator rotation wheel 50 by using multiple second screws P.

Figure 4:
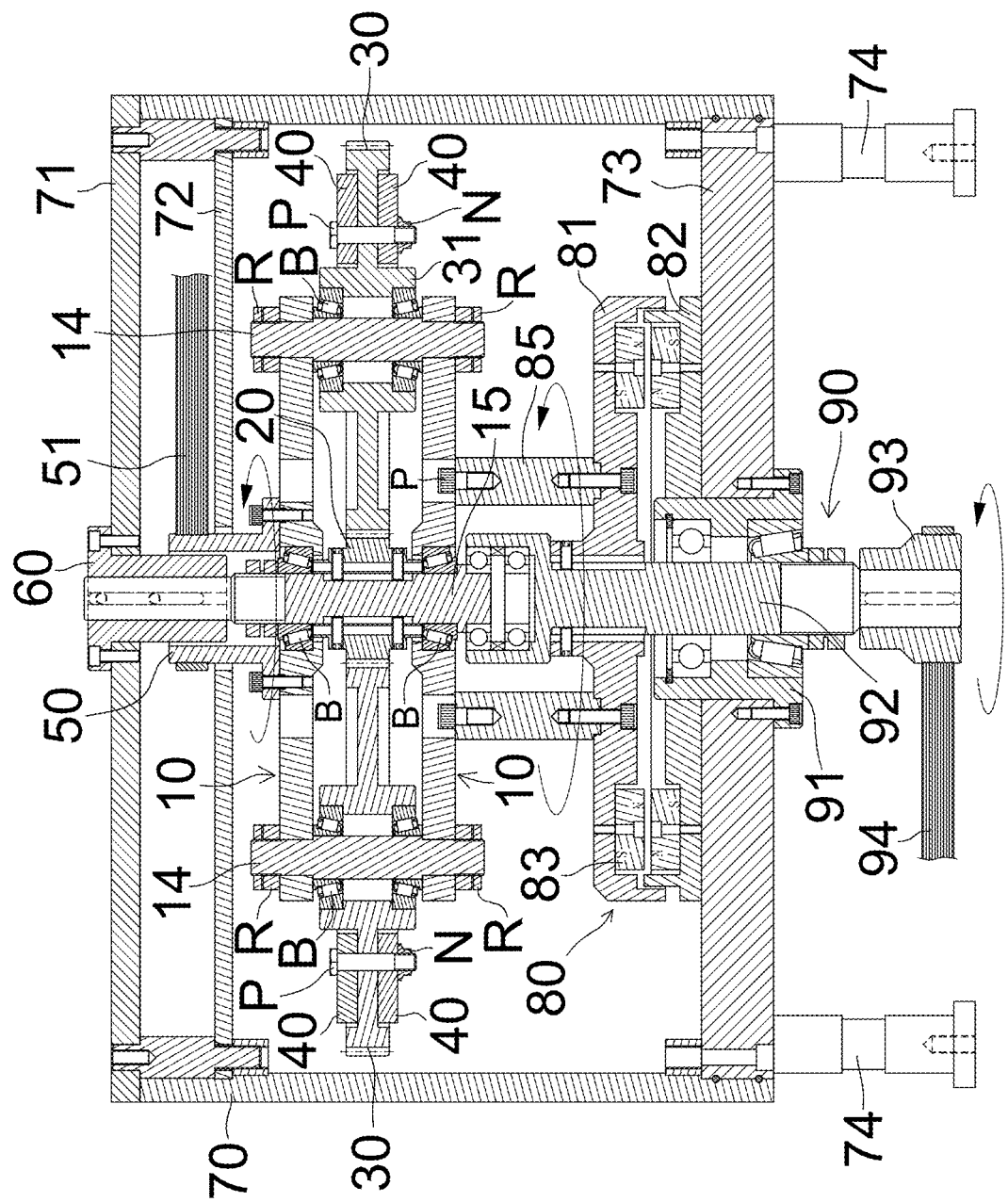
FIG. 4 is a cross sectional view showing the application of the planetary gear type throwing wheel device according to the preferred embodiment of the present invention.

FIG. 4 is a cross sectional view showing the application of the planetary gear type throwing wheel device according to the preferred embodiment of the present invention. The planetary gear type throwing wheel device is mounted on a machine 70, wherein the machine 70 includes a first fixer 71, a second fixer 72, and a third fixer 73 which are horizontal to one another, and multiple racks 74 connected on a bottom of the third fixer 73, wherein the generator rotation wheel 50 is fixed on the second fixer 72, and the generator rotation wheel 50 includes a drive element 51 configured to connect with and actuate a power generator, the generator rotation wheel 50 is rotatably connected with the first fixer 71 by using a locating stem 60, and a bottom of the third fixer 73 is connected with a magnetic levitation turntable 80. The magnetic levitation turntable 80 includes a movable disc 81, a fixed disc 82 stacked on the movable disc 81, multiple magnetic elements 83, 84 defined between the movable disc 81 and the fixed disc 82, wherein a magnetism of the movable disc 81 is identical to a magnetism of the fixed disc 82 so that the movable disc 81 and the fixed disc 82 are repel each other. The movable disc 81 is locked below the two rotatable discs 10 by multiple connection posts 85 and multiple third screws P, wherein the fixed disc 82 is mounted on the third fixer 73, a starting mechanism 90 is connected on a bottom of the third fixer 73, and the starting mechanism 90 includes a bearing assembly 91, wherein the bearing assembly 91 includes an actuation shaft 92, and a top of the actuation shaft 92 is connected with the central shaft 15 of the planetary gear type throwing wheel device, wherein the actuation shaft 92 has a driving wheel 93 connected on a bottom thereof, the driving wheel 93 has a transmitting element 94 configured to drive a motor to rotate. A friction coefficient of the planetary gear type throwing wheel device is reduced by a maglev effect of the magnetic levitation turntable 80 so that a repulsive thrust produces along a tangent line of a peripheral side of the planetary gear type throwing wheel device, when the planetary gear type throwing wheel device rotates, thus reducing a rotation loading, a friction force and a power consumption of the planetary gear type throwing wheel device.

Figure 5:
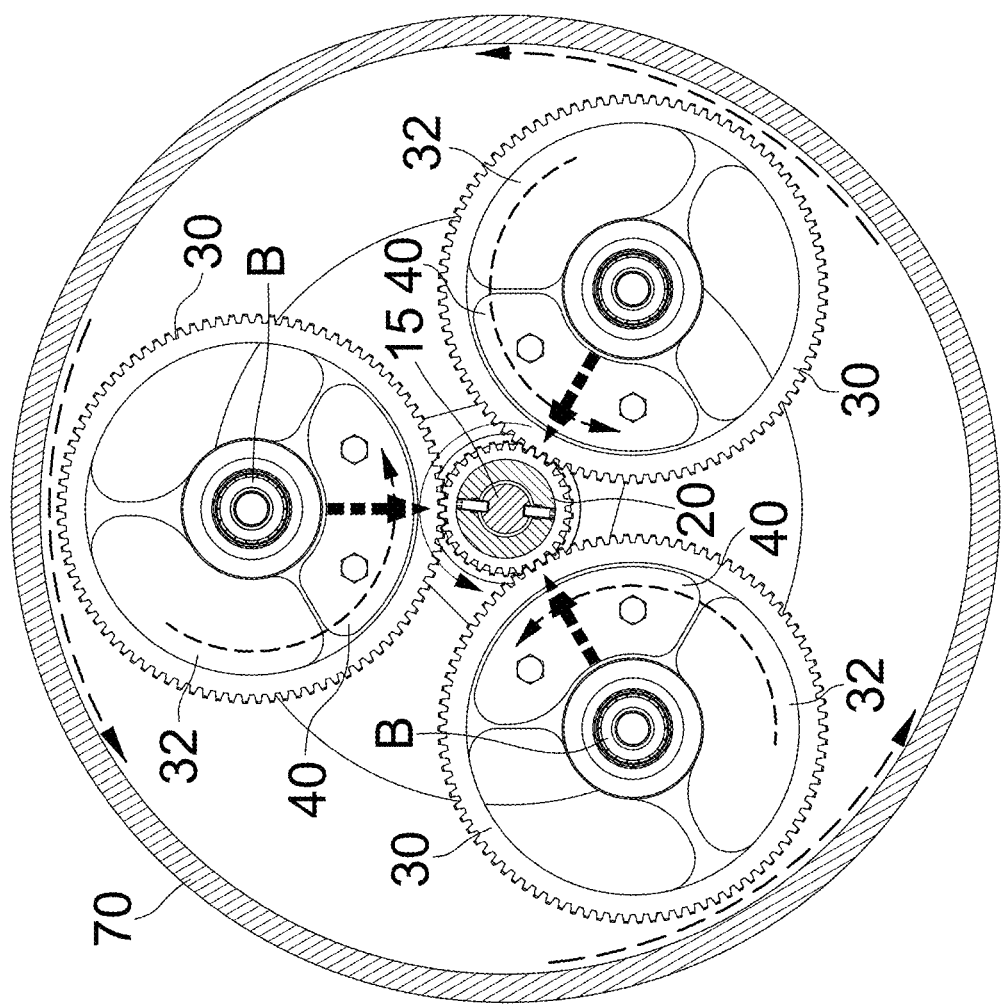
FIG. 5 is a cross sectional view showing the operation of the planetary gear type throwing wheel device according to the preferred embodiment of the present invention.
Figure 6:
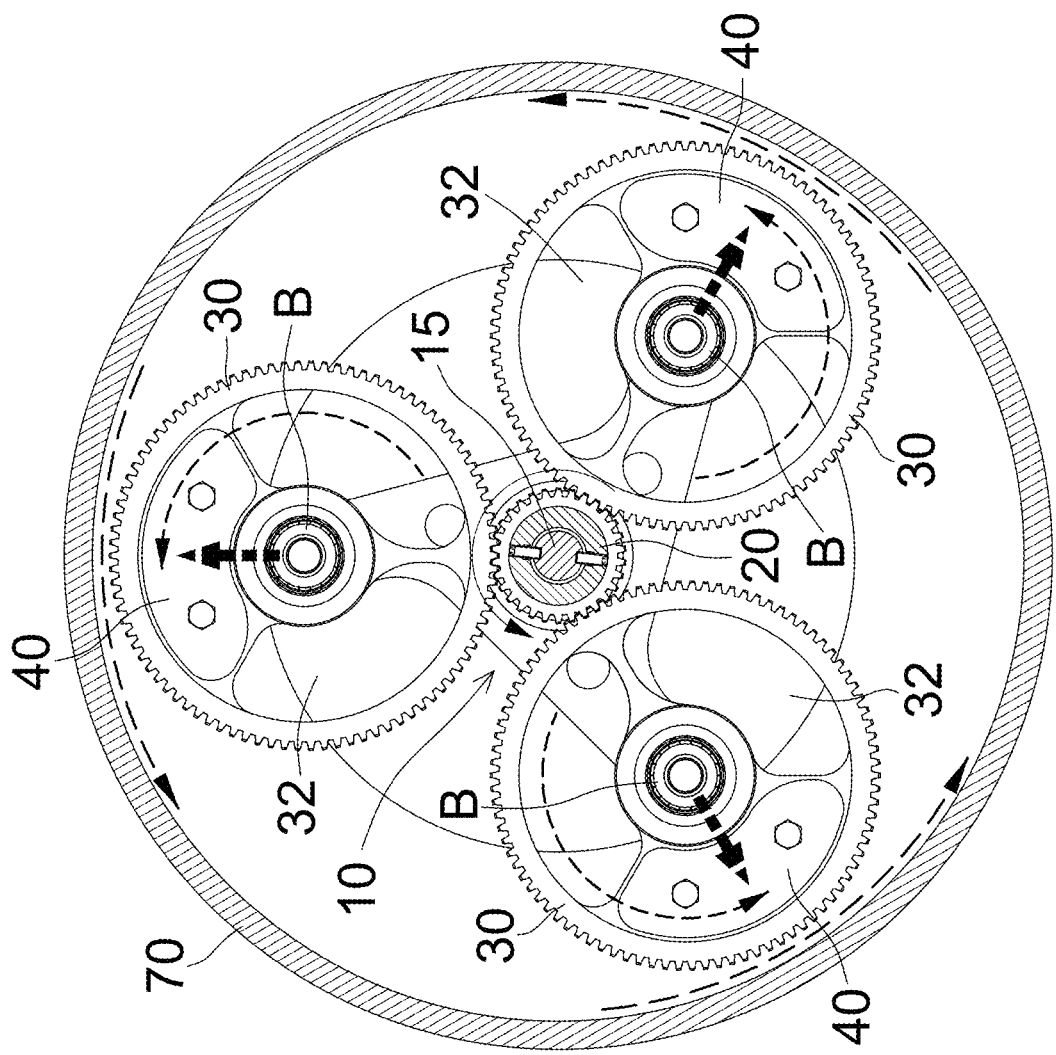
FIG. 6 is another cross sectional view showing the operation of the planetary gear type throwing wheel device according to the preferred embodiment of the present invention.

FIG. 5 is a cross sectional view showing the operation of the planetary gear type throwing wheel device according to the preferred embodiment of the present invention. FIG. 6 is another cross sectional view showing the operation of the planetary gear type throwing wheel device according to the preferred embodiment of the present invention. The planetary gear type throwing wheel device does not rotate itself but is operated by using a little external force. For example, the central shaft 15 of the planetary gear type throwing wheel device is driven by the motor to actuate the central shaft 15 to rotate, thus producing a large torque of the planetary gear type throwing wheel device.

When the central shaft 15 actuates the transmission gear 20 to rotate, the three throwing force gears 30 are driven by the transmission gear 20 to rotate so that the six counterweight elements 40 produce a throwing force, and the large torque is generated from the central shaft 15 to rotate the generator rotation wheel 50. Each counterweight element 40 operates at 120 degrees smoothly in a low noise by using the three throwing force gears 30, thus rotating the power generator successively with the large torque. For example, when rotating the power generator in 15 kw, an efficiency of the power generator reaches 90% to produce 13 kw powers. The power generator supplies a small power (such as 1 kw) to the motor, and the other power (i.e. 12 kw) is saved or supplies to other equipment. Preferably, the three throwing force gears 30 are horizontal to one another, they operate smoothly and stably to save the power consumption.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A planetary gear type throwing wheel device comprising: a central shaft rotatably locked on centers of two rotatable discs, and a transmission gear locked on the central shaft, wherein each rotatable disc includes three supports isometrically extending outward therefrom, and three columns are received in outer ends of the three supports and are configured to be rotatably connected with three throwing force gears, wherein the transmission gear meshes with the three throwing force gears to drive the three throwing force gears to rotate, each throwing force gear includes a defining portion formed on a side of a surface thereof, and multiple counterweight elements are disposed on a top and a bottom of the defining portion, wherein a generator rotation wheel is fixed on a top of a top rotatable disc of the two rotatable discs, an actuation shaft is connected with a bottom of the central shaft, and the actuation shaft has a driving wheel, such that the driving wheel drives the transmission gear to rotate the three throwing force gears simultaneously so that the six counterweight elements produce a throwing force, and a large torque is generated from the central shaft to rotate the generator rotation wheel.

2. The planetary gear type throwing wheel device as claimed in claim 1, wherein the six counterweight elements are disposed on a top and a bottom of the defining portions.

3. The planetary gear type throwing wheel device as claimed in claim 1, wherein a hollow portion is formed on the other side of the surface of each throwing force gear.

* * * * *